(No Model.)
J. C. VICKREY.
CATCHING AND HOLDING TOOL.
No. 592,030. Patented Oct. 19, 1897.
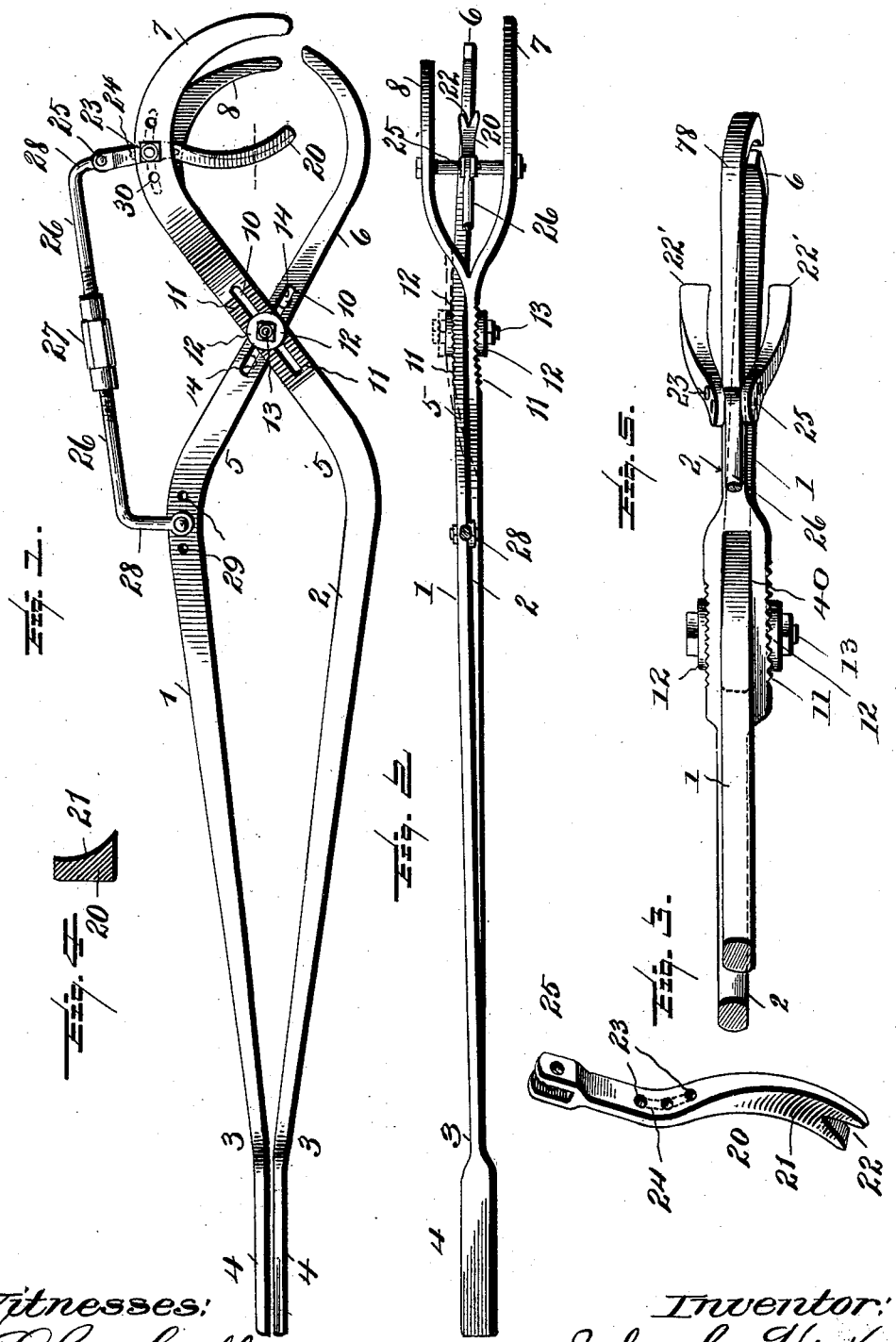
Witnesses:
L. C. Hills,
J. H. Jochum, Jr.
Inventor:
John C. Vickrey,
by Collamer & Co., Att'ys.

UNITED STATES PATENT OFFICE.

JOHN C. VICKREY, OF RENO, INDIANA.

CATCHING AND HOLDING TOOL.

SPECIFICATION forming part of Letters Patent No. 592,030, dated October 19, 1897.

Application filed April 10, 1897. Serial No. 631,504. (No model.)

*To all whom it may concern:*

Be it known that I, JOHN C. VICKREY, a citizen of the United States, and a resident of Reno, Hendricks county, State of Indiana, have invented certain new and useful Improvements in Catching and Holding Tools; and my preferred manner of carrying out the invention is set forth in the following full, clear, and exact description, terminating with claims particularly specifying the novelty.

This invention relates to the care of live stock, and more especially to catching and holding tools; and the object of the same is to produce an improved device for grasping the nose or snout of a hog or pig, in order to hold the animal while ringing is taking place or for other purposes.

To this end the invention consists in a tool constructed substantially like a pair of scissors or pincers, with alterations to adapt it to the work to be performed, all as set forth below and as illustrated in the accompanying drawings, in which—

Figure 1 is a side view of the tool ready for use. Fig. 2 is a plan or top view of the same. Fig. 3 is a detail in perspective of the intermediate tongue. Fig. 4 is a section of the tongue, taken on the dotted line through this member in Fig. 1. Fig. 5 is a plan view of a modification of the fingers and tongue, omitting the link. This view shows my preferred form of pivot.

Referring by reference-numerals to said drawings, 1 and 2 are the main arms, turned outward away from each other near their rear ends, as at 3 3, and having flattened handles 4 4. Near their front or operative ends these arms turn inward as at 5 and may cross each other in the manner of a pair of scissors—the upper arm having at its front end a downwardly-bent prong 6, and the lower arm having a fork consisting of two upwardly-bent fingers 7 8. The latter stand above the space for the snout, as seen, and the finger 8 stands nearer to the prong 6 at the bottom and also nearer the hinge, whereby the snout-space is made slightly tapering in order to more firmly grasp the nose of the pig. It is obvious that the tool could, however, be inverted, when the prong 6 would stand at the top and the fingers below.

The hinge or pivot between the scissors-like arms consists of slots 10 through them, which necessarily cross each other, and the body of each arm on its outer surface is toothed as at 11. 12 12 are washers having serrated or toothed inner faces engaging the teeth 11, and through these washers and through the crossing-point of the two slots 10 is passed a bolt 13. Adjustment of the pivot is effected by loosening the bolt until the washers are free to move over the teeth 11, then sliding the slots over the shank of the bolt as desired, and finally resetting the bolt, though not too tightly. If preferred, one arm, instead of having the slot, may have holes, as indicated in dotted lines at 14; or, in fact, these holes could be formed in both members if desired instead of slots. Then the teeth might be dispensed with.

The numeral 20 designates a tongue having its front face slightly dished transversely, as seen at 21, Fig. 4, and preferably having its lower end forked as at 22, Fig. 3, in order to pass astride the teeth or tushes of the animal to be held. The body of this tongue is curved oppositely to the curvature of the fingers 7 8, and passes upward between them where it is provided with holes 23, or with an adjusting-slot 24, as above mentioned, if preferred, (see dotted lines,) and in its upper end is an eye 25.

26 26 are the two members of a link whose inner ends are oppositely threaded and connected by a turnbuckle 27, while their outer ends are turned down as at 28 and adjustably pivoted in holes 29, formed in the elbow 5 of the upper arm 1 and in the eye 25 at the upper end of the tongue 20, as shown. Through the two fingers 7 8 are formed several alined holes 30, in any one of which the pivotal bolt or pin that passes through the body of the tongue may be engaged, so as to render this pivot also adjustable.

In Fig. 5 is shown an obvious modification of the shape of fingers and tongue, and also my preferred form of the pivot above described. Here one member or arm where it crosses the other has an opening 40, through which said other member passes, (like a pair of pincers,) and the teeth 11 are on the outer sides of this arm alone, while the adjustment of the pivot is effected in substantially the same way. Obviously, this form of pivot could be used as seen in dotted lines on the construction shown in Fig. 1 without departing from the spirit of my invention. In Fig. 5 is illustrated also how the tongue might be provided with the two fingers, as 22', and the sides of the arm 2 united in a single upper prong 78, working between the fingers, as shown, the operation being, however, substantially the same as if the fingers were on the arm. In fact, it will be obvious that the fork 22 at the lower end of the tongue (shown in Fig. 2) might be continued so high up that it would in effect produce two fingers there, so that there would be practically five members to grasp the pig's snout.

In operation, the user takes the tool in his hands, either side up, and an assistant drives the animal to the proper point or holds him there. The opening is passed over his snout with the larger finger next his head, so that the smaller one will stand over the smaller end of the nose, and the handles 4 4 are then pressed together. This brings the fingers down and the prong up, and at the same time the link causes the curved lower end of the tongue to be thrown outward against the side of the snout, the fork therein standing astride the prominent teeth or tush, so as to prevent injury thereto and also produce a better grasp and the dished face grasping at both edges. While held in this position, another operator rings the nose or performs whatever work is to be done on the animal, after which a mere separation of the handles causes the parts to open, and the hog is free.

I do not limit myself to the precise details of construction set forth, as considerable change therein may be made without departing from the principle of my invention. The exact sizes, shapes, proportions, and materials of parts are also immaterial.

What is claimed as new is—

1. In a tool of the character described, the combination, with a member having a curved finger, and a second member pivoted to the first; of a curved tongue coöperating with said finger and its body pivoted thereto, a two-part link pivoted to said second member and the upper end of the tongue, and a turnbuckle between its parts, as and for the purpose set forth.

2. In a tool of the character described, the combination, with a member having a curved front end, and a second member pivoted to the first; of a tongue having a curved lower end coöperating with the curved end aforesaid, one of such ends being forked, an adjustable pivot between the body of the tongue and the first-mentioned member, and a link pivotally connecting the upper end of the tongue with said second member, as and for the purpose set forth.

3. In a tool of the character described, the combination, with two members whose arms cross each other and whose front ends are formed into oppositely-curved parts, and an adjustable pivot at the crossing-point; of a tongue having a curved and laterally-dished lower end standing within the opening between said parts, its body being pivoted to one of the latter, and connections between its upper end and the arm of the other part, as and for the purpose set forth.

4. In a catching and holding tool, the combination, with two members whose arms cross each other and are pivoted at their crossing-point and whose front ends are formed into a downwardly-curved prong at the bottom and two upwardly-curved fingers at the top of the snout-opening, one of said fingers being nearer the prong and nearer the pivot than the other for the purpose set forth; of a tongue pivoted between said fingers, and means for moving it forward as the parts come together, substantially as described.

5. In a catching and holding tool, the combination, with two members whose arms cross each other and are there pivoted and whose front ends are oppositely curved, one in a lower prong and the other in two upper fingers of which one is nearer the prong and nearer the pivot than the other; of a tongue having a laterally-dished curved inner end forked at its extremity and standing between the fingers and prong, a pivot through its body and one of said front ends, and means for moving its inner end forward as the members are operated, as and for the purpose set forth.

6. In a catching and holding tool, the combination, with two members whose arms are bent inward and cross each other and whose front ends are formed in oppositely-curved parts, one of the latter comprising two fingers of which one stands nearer the other part and nearer the crossing-point than the other, the arms at their crossing-point having lateral openings, and teeth on their outer faces; of a bolt passing through said openings, and washers under its head and nut having serrated inner faces engaging said teeth, as and for the purpose set forth.

In testimony whereof I have hereunto subscribed my signature on this the 31st day of March, A. D. 1897.

JOHN C. VICKREY.

Witnesses:
ALDA GREENLEE,
ALONZO WHITAKER.